Sept. 23, 1952 G. D. HULST 2,611,881

TELEVISION RECEIVER

Filed May 24, 1950 3 Sheets-Sheet 1

INVENTOR.
GEORGE D. HULST
BY Daly & Daly
ATTORNEYS

TELEVISION RECEIVER

Filed May 24, 1950 3 Sheets-Sheet 2

INVENTOR.
GEORGE D. HULST
BY Daly & Daly
ATTORNEYS

INVENTOR.
GEORGE D. HULST
BY Daily & Daily
ATTORNEYS

Patented Sept. 23, 1952 2,611,881

UNITED STATES PATENT OFFICE 2,611,881

TELEVISION RECEIVER

George D. Hulst, Upper Montclair, N. J., assignor to Allen B. Du Mont Laboratories, Inc., Clifton, N. J., a corporation of Delaware Application May 24, 1950, Serial No. 163,826

5 Claims. (Cl. 315—31)

My invention relates to television receivers and more particularly to power supplies therefor.

Television receivers in present use are provided with a number of controls for tuning to various stations and for adjusting the quality of a received picture. Among these controls are usually a tuning control, a contrast control, a picture brightness control, and a focus control.

Television receivers in use today contain, in addition to a cathode ray picture tube, a large number of other thermionic tubes, serving as amplifiers, clippers, oscillators, and so forth, most of which tubes utilize power from a direct current source. It has been the usual practice to connect these elements in parallel to a common rectifier. Television receivers also usually contain an electromagnet providing a field parallel to the longitudinal axis of the picture tubes, to provide focusing for the cathode ray electron beams. This electromagnet, which contains a large number of turns of copper wire, consumes an appreciable amount of power from the receiver and experiences a considerable variation in temperature during operation. This change of temperature causes a corresponding change of resistance in the copper wire. In order to avoid changes of focusing current with these changes in resistance, it has been customary to connect the focus coil in series with the direct current supply, between it and the aforesaid parallel connected thermionic tubes.

This practice has had the disadvantage that changes in picture brightness or contrast, which change the amount of direct current consumed in the video amplifier, change the current flowing through the focus coil and cause defocusing. When an operator wishes to adjust picture brightness, for instance, he must first adjust the brightness control and then afterwards refocus the picture by means of the focus control. This procedure is annoying to a skilled operator and confusing to an unskilled one, and is therefore undesirable.

Similarly, when a receiver is tuned from a nearby transmitting station having a strong received signal to a more distant station having a weak received signal, the current in the intermediate frequency amplifiers changes to provide gain control, which may be automatic or manual, and this changing of station also necessitates a readjustment of the focusing control.

It is an object of this invention to provide a receiver in which the operating controls are independent of one another.

It is another object to provide a receiver which is simple to operate.

It is a further object to provide a receiver in which it is not necessary to readjust the focusing control after a change in the tuning, brightness, or contrast controls.

Most television receivers now in use are provided with means for preventing ion burns or blemishes in the cathode ray picture tube. This is usually an electromagnet which bends the cathode ray electron beam in the electron gun, causing the electrons to pass through a small aperture. In this structure, the ions, because of their much greater mass, are trapped and prevented from damaging the fluorescent screen. If the current in the electromagnet changes with changes in settings of contrast, brightness, tuning, or focusing controls, it can cause the electron beam to intercept an edge of the aperture. This reduces the range of picture contrast. It also causes local heating to occur at the intercepted edge, which results in partial destruction of this portion of the tube by evaporation of the metal.

It is therefore a further object to provide a receiver having an ion trap electromagnet in which the actuating current is independent of the operating controls.

In accordance with my invention, the stages of a television receiver utilizing a constant amount of direct current are connected in series with the focusing and beam bending electromagnets, and the other stages, which consume varying amounts of direct current in accordance with changes in received signal or operating controls, are connected to another part of the direct current supply having a low impedance common to the aforesaid fixed stages.

Figure 1:
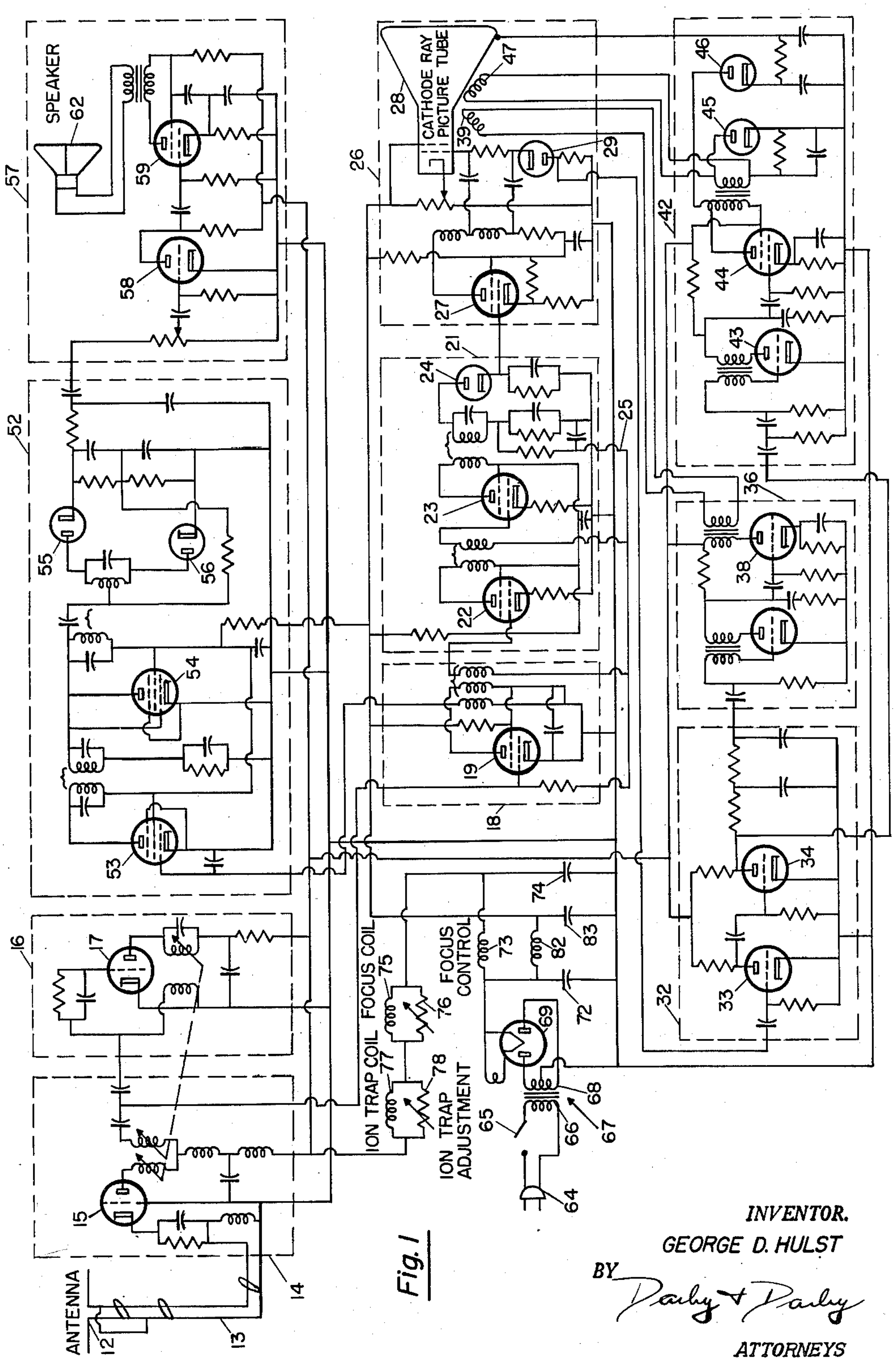
Figure 1 is a schematic drawing of a typical television receiver embodying my invention.

Referring to the schematic diagram of Figure 1, an antenna 12 is connected by means of a lead-in wire 13 to a signal frequency amplifier stage 14 containing an amplifier tube 15. An oscillator stage 16 containing an oscillator tube 17 is connected to the signal frequency amplifier 14, and both are connected to a heterodyne mixer stage 18 containing a mixer tube 19. The heterodyne mixer stage 18 is connected to an intermediate frequency picture amplifier and detector stage 21 containing the amplifier tubes 22 and 23 and the detector tube 24.

The detector tube 24 is connected to a picture reproducer and synchronization signal separator stage 26 containing a video amplifier tube 27, a cathode ray picture tube 28 and a direct current restorer tube 29 which also serves the function of synchronization signal separation. The detector tube 24 is connected to and provides automatic gain control bias by means of the bias line 25 to the mixer tube 19 and the intermediate amplifier tubes 22 and 23. The tube 29 is connected to a synchronization signal clipper stage 32 containing the clipping tubes 33 and 34. The clipper stage 32 is connected to a vertical deflection generator stage 36 containing a vertical oscillator tube 37 and a vertical deflection amplifier tube 38.

This latter tube 38 provides a sawtooth deflection current to a vertical deflection yoke 39 for the picture tube 28. Connected also to the clipper stage 32 is a horizontal deflection generator stage 42 containing a horizontal oscillator tube 43, a horizontal deflection amplifier tube 44, a damper tube 45, and a high voltage rectifier tube 46, this latter providing direct accelerating voltage to the second anode of the picture tube 28. Connected to the horizontal deflection amplifier tube 44 and receiving a sawtooth current therefrom is a horizontal deflection yoke 47.

An intermediate frequency sound amplifier stage 52 containing amplifier tubes 53 and 54 and detector tubes 55 and 56 is connected to and receives a signal from the heterodyne mixer 18. The intermediate frequency sound amplifier and detector stage 52 is also connected to and provides a signal for a sound reproducer stage 57 containing a first audio amplifier tube 58, a power output tube 59, and a speaker 62.

These several stages of the television receiver circuit utilize direct current power provided by the rectification of alternating current. This part of the circuit comprises a connecting plug 64, adapted to fit and make contact with the usual household alternating current outlet, a switch 65, and the primary winding 66 of a power transformer 67, these being connected in series. The secondary winding 68 of the transformer 67 is connected to a full wave rectifier tube 69 which charges an input filter capacitor 72. The filter capacitor 72 is attached to a choke coil 73 serving as a series filter element and hence to a second filter capacitor 74. Since the series choke 73 might alternatively be a series resistor, it will hereinafter be referred to as a filter reactor, as distinguished from the filter capacitors 72 and 74.

The filter reactor 73 is connected in series with a focus coil 75 which is a direct current electromagnet of the usual form and which has a variable resistor 76 connected in parallel across it, the resistor 76 being used as a focus adjustment. The focus coil 75 is in turn connected to a second direct current electromagnet 77, this one being an ion trap magnet used to bend the electron beam so that ions will not cause a blemish on the fluorescent screen of the cathode ray tube 28. An adjustment for the ion trap magnet is provided by the variable resistor 78.

The ion trap magnet 77 is in turn connected to and supplies direct current to the stages of the receiver which utilize a constant amount of power, these stages being the signal frequency amplifier 14, the heterodyne oscillator 16, the synchronization signal clipper 32, the deflection generators 36 and 42 and the sound reproducer 57. The horizontal deflection generator 42 can be classified as a constant direct current consuming stage, for although it supplies rectified high voltage power to the second anode of the cathode ray tube, and this power varies with picture content, these changes are compensated by changes in power consumed by the damper tube 45, so that the total power drawn by the entire stage 42 is essentially constant. The power output tube 59 of the sound reproducer stage 57 is operated Class A so that its power consumption does not vary with audio signals.

A second choice or filter reactor 82 is connected between the filter capacitor 72 and a third filter capacitor 83. To the filter reactor 82 and in series with it, are connected in parallel the stages which consume variable amounts of direct current. These stages are: the heterodyne mixer stage 18 and the intermediate frequency amplifiers 21 and 52, which consume varying amounts of direct current in accordance with the relative strength of received signals, and the picture reproducer stage 26 which consumes varying amounts of power in accordance with the settings of brightness and a contrast controls, and also with the amount of relative black and white in the picture being transmitted.

Figure 2:
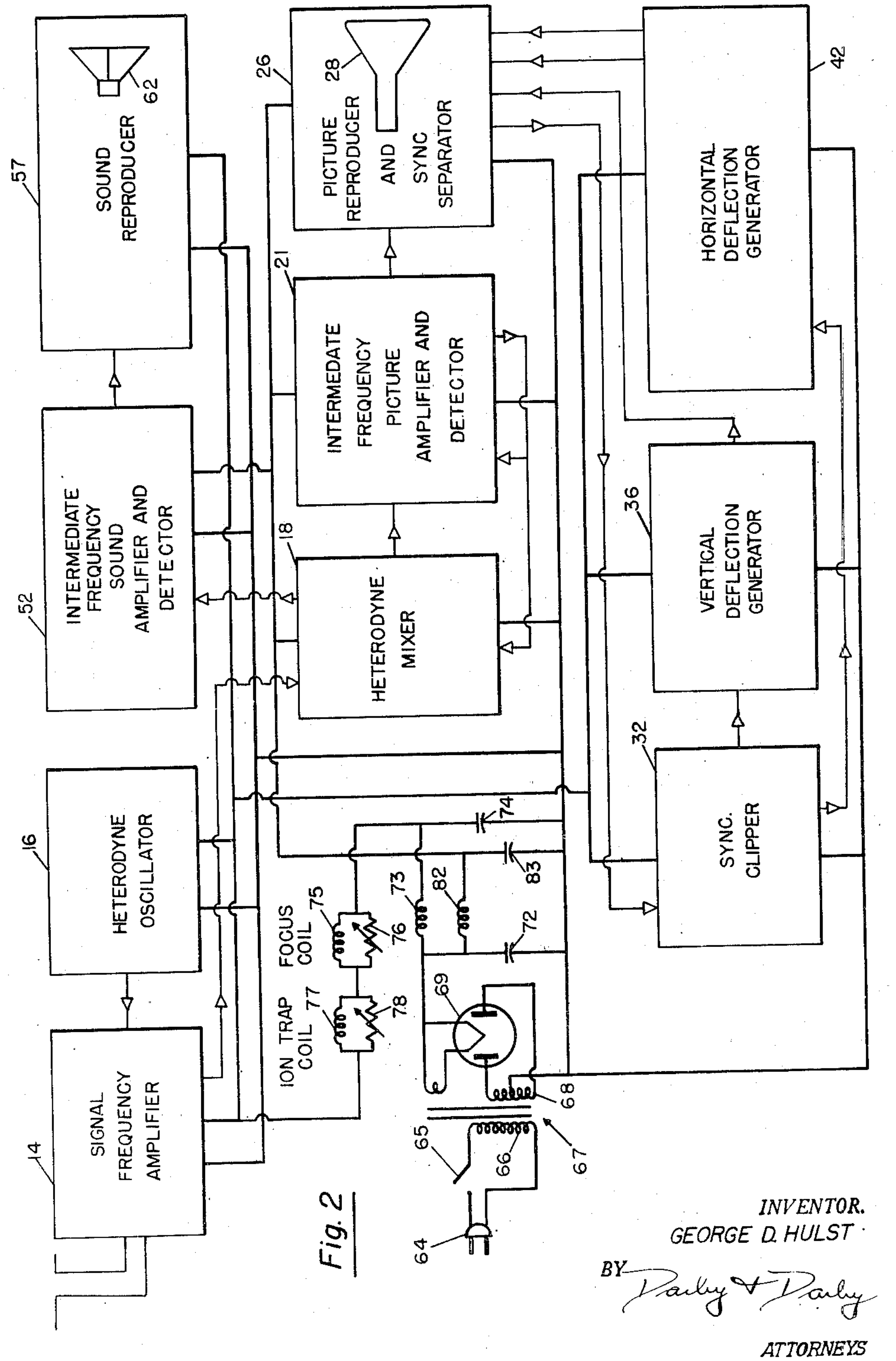
Figure 2 is the same receiver shown in block form.
Figure 3:
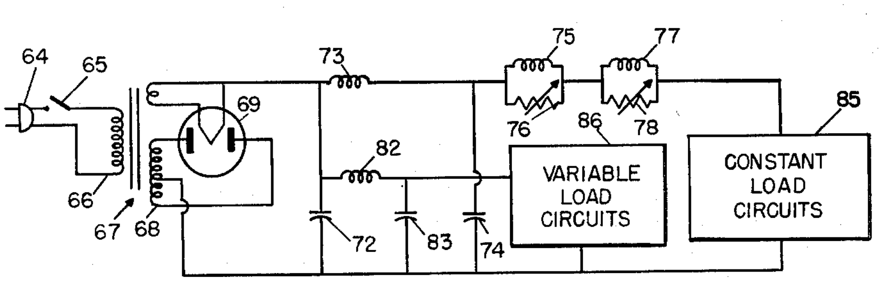
Figure 3 is a simplified block diagram of the same receiver.

The operation of the invention can be understood by referring to the block diagrams of Figures 2 and 3. In Figure 2 the direct current power connections between stages have been drawn in heavy lines, other connections between the stages being in light lines. In Figure 3, all the stages 14, 16, 32, 36, 42, and 57 which consume a constant amount of direct current have been lumped into a constant load box 85 and all the variable stages 18, 21, 26, and 52 have been lumped into a variable load box 86. Changes in current occurring in any of the variable stages 86 cause a change in direct current flowing in the filter reactor 82 and through the rectifier tube 69. If the capacitor 72 is sufficiently large, these changes in current will not appreciably affect the current flowing in the branch containing the electromagnets 75 and 77. In the preferred form shown, the constant load branch is provided with its own filter reactor 73, this being preferable to connecting this branch to the capacitor 83 because the resistance of the filter reactor 82 would in the latter case be common to the two branches, causing a certain amount of interaction between the branches.

Since the electromagnets 75 and 77 are connected in series with the constant load circuits 85 and since the latter comprise the major portion of the power in this branch, the current flowing through the electromagnets is determined primarily by the load drawn by the load circuits 85 which are constant. Therefore each electromagnet may be considered to be operating in a substantially constant current circuit and will therefore be substantially unaffected by changes in the adjustment of the other.

Figure 4:
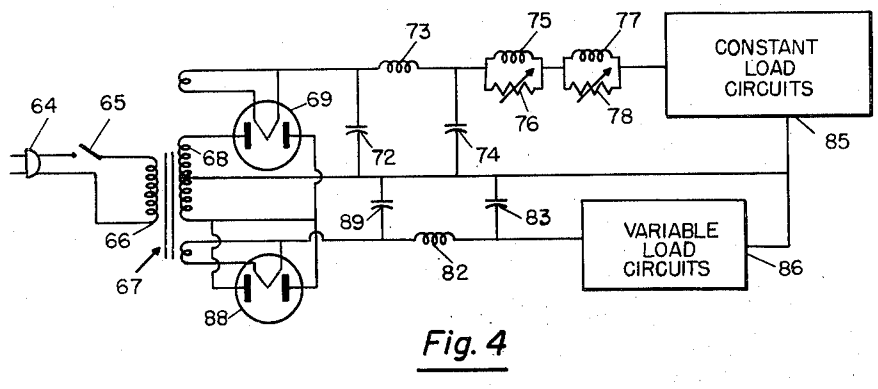
Figures 4 and 5 are block diagrams of alternative embodiments of the invention.

In Figure 4 is shown an alternative embodiment particularly adapted to high quality television receivers in which more than one rectifier tube is required to supply sufficient direct current to the various stages. In this embodiment a second rectifier tube 88 is connected to and charges a separate filter capacitor 89 so that the constant and variable stages have separately rectified supplies.

Figure 5:
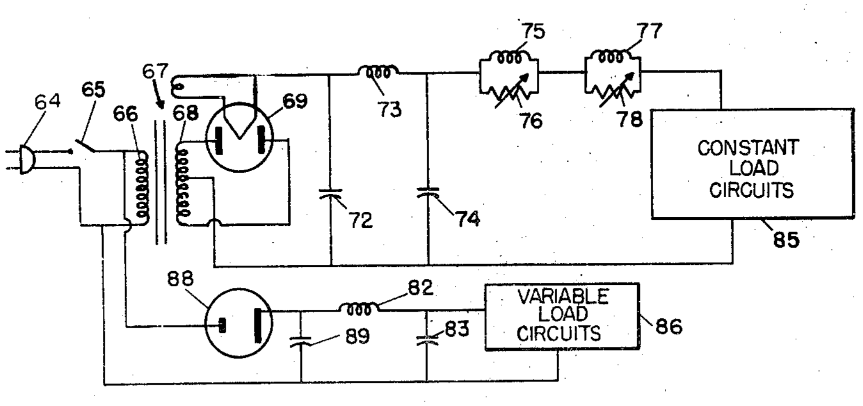

In Figure 5 is shown an embodiment particularly adapted to television receivers in which economy of apparatus is of paramount importance. In this embodiment the variable circuits 86 which comprise the mixer, intermediate frequency and video stages are connected through a filter reactor 82 and rectifier 88 to the primary 66 of the transformer 67. These variable circuits do not require a high direct voltage and the cost of the transformer 67 is very much reduced by having it supply only the fixed load stages 85.

In all the embodiments shown, no specific means for heating the cathodes of the various thermionic tubes have been described, since these are well known in the radio and television art.

Although specific embodiments have been shown and described to illustrate my invention, it is understood that variation thereof may be made without departing from the spirit and scope of the invention.

What is claimed is:

1. In a television receiver containing a source of direct current, a first circuit comprising a direct current electromagnet connected in series to a plurality of parallel connected constant direct current consuming stages, and a second circuit including a plurality of parallel connected variable direct current consuming stages, said first and second circuits being connected to said source of direct current in parallel.

2. In a television receiver containing a source of direct current, a first circuit comprising a beam focusing electromagnet connected in series to a plurality of parallel connected constant direct current consuming stages, and a second circuit comprising a plurality of parallel connected variable direct current consuming stages, said first and second circuits being connected to said source of direct current in parallel.

3. In a television receiver containing a source of direct current, a first circuit comprising an ion trap electromagnet connected in series to a plurality of parallel connected constant direct current consuming stages, and a second circuit comprising a plurality of parallel connected variable direct current consuming stages, said first and second circuits being connected to said source of direct current in parallel.

4. In a television receiver including a source of direct current, a first series circuit comprising a filter reactor, a direct current electromagnet and a plurality of constant direct current consuming stages, and a second series circuit comprising a second filter reactor and a plurality of variable direct current consuming stages, said source of direct current, said first circuit, and said second circuit being connected in parallel.

5. In a television receiver containing a source of alternating current, a transformer having a primary winding connected to said source and a secondary winding connected to a pair of rectifiers, a first series circuit comprising one of said rectifiers, a filter reactor, a direct current electromagnet and a plurality of constant direct current consuming stages, said series circuit being connected across said secondary winding, and a second series circuit comprising the second of said rectifiers, a second filter reactor and a plurality of variable direct current consuming stages connected in parallel, said second series circuit being connected across said secondary winding.

GEORGE D. HULST.

REFERENCES CITED

The following references are of record in the file of this patent:

UNITED STATES PATENTS

| Number | Name | Date |
|---|---|---|
| 2,154,311 | Levy | Apr. 11, 1939 |
| 2,255,485 | Dome | Sept. 9, 1941 |